United States Patent Office 3,360,336
Patented Dec. 26, 1967

3,360,336
MANUFACTURE OF NITROUS OXIDE
William T. Curless, Overland Park, and Glenn A. Terry, Prairie Village, Kans., assignors, by mesne assignments, to Gulf Oil Corporation, Pittsburgh, Pa., a corporation of Pennsylvania
No Drawing. Filed Feb. 4, 1964, Ser. No. 342,520
10 Claims. (Cl. 23—158)

This invention relates to the manufacture of nitrous oxide by decomposition of ammonium nitrate. More particularly, this invention is concerned with the thermal decomposition of molten ammonium nitrate in the presence of agents which increase the rate of formation of the desired product, and with other agents which act to smooth the reaction.

It is known that ammonium nitrate decomposes to form nitrous oxide within a temperature range of about 170 to 350° C., usually within the range of about 200 to 300° C. The process is subject to certain disadvantages, among which are side reactions in which other oxides of nitrogen and nitrogen itself are formed. These side reactions tend to increase in importance, the higher the temperature. Certain of these side reactions are quite exothermic. If they are allowed to increase in importance, the decomposition of the ammonium nitrate can become self-sustaining with resulting violent decomposition. Another disadvantage sometimes found during the thermal decomposition of ammonium nitrate to yield nitrous oxide is the roughness of the reaction, that is, the release of gas from the melt in bubbles of varying volume, with much bumping and turbulence.

It has now been discovered that certain substances, particularly sulfates, may be added to the ammonium nitrate melt as catalysts. The addition of these catalysts results in a more efficient production of nitrous oxide, allowing a lower temperature to be used to produce nitrous oxide at a given rate. It has also been discovered that certain other substances, particularly elements of Group II of the Periodic Table, may be added to the melt to smooth the thermal decomposition reaction although the rate of reaction in the presence of these substances remains unchanged. These smoothing agents change the characteristics of the gas evolution from the ammonium nitrate melt. Furthermore, in certain instances both the smoothing agents and the sulfate catalyst of this invention or the phosphate catalyst reported in U.S. Patents 2,111,276 and 2,111,277 may be added simulanteously to ammonium nitrate, thus allowing both an increase in reaction rate and extensive smoothing of the decomposition reaction.

Briefly, this invention comprises the improvement of the method of producing nitrous oxide by thermal decomposition of ammonium nitrate by conducting the reaction in the presence of anions which increase the rate of formation of nitrous oxide, preferably sulfate, bisulfate, or other sulfur-containing anions, by performing the thermal decomposition of ammonium nitrate in the presence of cations of metals of Group II of the Periodic Table, preferably zinc, magnesium, calcium, or barium, as agents for smoothing and controlling the decomposition. The thermal decomposition of ammonium nitrate to yield nitrous oxide may be carried out in the presence, with certain restrictions, of both sulfate, bisulfate, or other sulfur-containing anions or other catalysts for the formation of nitrous oxide and simultaneously in the presence of cations of metals of Group II of the Periodic Table as agents for smoothing and controlling the decomposition. The condition necessary for the simultaneous use of the catalysts and smoothing agents is that they be mutually compatible as indicated by solution of the desired amount of each in the melt of ammonium nitrate. For example, it has been found that substantial quantities of both zinc nitrate and ammonium sulfate will dissolve simultaneously in molten ammonium nitrate as will, for example, the combination of calcium nitrate and monoammonium phosphate.

In order that the invention may be more readily understood, the following examples are presented by way of illustration and not by way of limitation of the invention.

Examples 1–7

A general procedure for the use of a sulfur-containing anion as catalyst to increase the rate of formation of nitrous oxide by the thermal decomposition of ammonium nitrate is as follows:

In a 200 ml. 3-neck, round bottom flask were placed 200 g. of ammonium nitrate (2.5 moles) and 20 g. of ammonium sulfate (0.15 mole). A thermometer was placed through one neck extending into the ammonium nitrate. A water-jacketed condenser was connected to a second neck in position for distillation. The third neck was closed with a glass stopper. The ammonium nitrate and sulfate catalyst were heated to reaction temperature. Any ammonia or acid evolved was caught in standard acid in a receiver connected to the condenser for later analysis. The nitrous oxide was passed through the condenser, receiving flask, and sampling bulb into a wet test meter to determine the rate of reaction.

The results of this experiment and others similarly performed are shown in Table I.

TABLE I

| Ex. | Catalyst | Reaction Temp., °C. | Reaction Rate, percent of $NH_4NO_3$ Converted to $N_2O$ per Minute | Total Excess Acid or Base Evolved from Reaction as percent Available from Catalyst* |
|---|---|---|---|---|
| 1: | None | 255 | 0.7 | |
| 2: | 0.9% $Na_2SO_4$ | 255 | 1.0 | +42 |
| 3: | 2.3% $NaHSO_4$ | 254 | 0.9 | −52 |
| 4: | 10% $(NH_4)_2SO_4$ | 254 | 1.1 | +32 |
| 5: | None | 262 | 1.1 | |
| 6: | 2.3% $NaHSO_4$ | 262 | 1.6 | |
| 7: | 10% $(NH_4)_2SO_4$ | 262 | 1.8 | |

+ signifies base evolved.
− signifies acid evolved.

*Percent=100× $\dfrac{\text{titrated amount of acid or base recovered from reaction gases less acid evolved normally from uncatalyzed reaction}}{\text{theoretical amount of acid or base available from the catalyst}}$ These results indicate that sulfate and bisulfate are in equilibrium in the mixture.

Example 8

To demonstrate the use of a Group II element as a smoothing reagent during the reaction of ammonium nitrate to form nitrous oxide, there was heated to 255° C., a 200 g. (2.5 moles) quantity of ammonium nitrate and 2.9 g. (0.011 mole) of $Mg(NO_3)_2 \cdot 6H_2O$ in the same apparatus as previously described. Although reaction rate was unchanged from that of the reaction without a catalyst, the reaction proceeded much more smoothly with the surface of the melt covered with fine bubbles.

Example 9

To demonstrate the combined use of a Group II element as a smoothing reagent during the reaction of ammonium nitrate to form nitrous oxide and a sulfur containing type anion as catalyst to increase the rate of formation of nitrous oxide from ammonium nitrate, there were heated to 255° C., a 200 g. (2.5 moles) quantity of ammonium nitrate, 3 g. of zinc nitrate crystals (analytical reagent purity; formula $Zn(NO_3)_2 \cdot XH_2O$), and 2.3% $(NH_4)_2SO_4$. Solution of the zinc and sulfate compounds resulted and reaction to form nitrous oxide proceeded smoothly with the formation of many fine bubbles within the melt and on its surface at a rate of conversion to nitrous oxide of 1.0% of the ammonium nitrate per minute.

In a preferred procedure for operating the improved method, ammonium nitrate is melted in the decomposition reactor, the decomposition catalyst, with or without the Group II metal ion compound, is added, and a homogeneous solution is obtained. The reaction mixture is then heated, preferably to a temperature between about 200° and 300° C., and ammonium nitrate is added to the melt continuously or at intervals to maintain a reasonably constant quantity of material in the reactor.

In another preferred procedure for operating the improved method, ammonium nitrate is melted in the decomposition reactor and the smoothing agent, one of the Group II metal ion compounds, is added and a homogeneous solution is obtained. The reaction mixture is then heated, preferably to a temperature between about 200 and 300° C., and ammonium nitrate is added to the melt continuously or at intervals to maintain a reasonably constant quantity of material in the reactor.

Various modifications and variations of these procedures, as will occur to those who are skilled in the art, may be made without departing from the spirit and scope of the invention.

We claim:

1. In the method of production of nitrous oxide by thermal decomposition of molten ammonium nitrate within a temperature range of about 170 to 300° C., the improvement comprising conducting the thermal decomposition in the presence of a sulfur-containing anion selected from the group consisting of sulfate ion, bisulfate ion, and mixtures of sulfate and bisulfate ions in solution in said molten ammonium nitrate in a catalytic amount up to 10% by weight sufficient to increase the rate of said thermal decomposition.

2. In the method of production of nitrous oxide by thermal decomposition of molten ammonium nitrate within a temperature range of about 170 to 300° C., the improvement comprising conducting the thermal decomposition in the presence of a sulfur-containing anion selected from the group consisting of sulfate ion, bisulfate ion and mixtures of sulfate and bisulfate ions, in solution in said molten ammonium nitrate in a catalytic amount sufficient to increase the rate of said thermal decomposition, and also dissolved in said ammonium nitrate a salt of a Group II metal selected from the group consisting of beryllium, magnesium, calcium, strontium, barium, zinc, and cadmium in an amount sufficient to cause smoothing of the reaction.

3. The method according to claim 2 in which the Group II metal is zinc.

4. The method according to claim 2 in which the Group II metal is calcium.

5. The method according to claim 2 in which the Group II metal is magnesium.

6. The method according to claim 2 in which the Group II metal is barium.

7. The method according to claim 1 in which the sulfur-containing anion is sulfate.

8. The method according to claim 1 in which the sulfur-containing anion is bisulfate.

9. The method according to claim 1 in which a mixture of sulfate and bisulfate anions is present in the molten ammonium nitrate.

10. In the method of production of nitrous oxide by thermal decomposition of molten ammonium nitrate within a temperature range of about 170 to 300° C., the improvement comprising conducting the thermal decomposition in the presence of ammonium sulfate in solution in said molten ammonium nitrate in a catalytic amount sufficent to increase the rate of said thermal decompostion, and also dissolved in said ammonium nitrate an amount of zinc nitrate sufficient to cause smoothing of the reaction.

References Cited

UNITED STATES PATENTS

| Re. 19,953 | 5/1936 | Friederich | 23—158 |
| 1,098,305 | 5/1914 | Torley et al. | 23—157 |
| 2,111,276 | 3/1938 | Castner et al. | 23—158 |
| 2,111,277 | 3/1938 | Castner et al. | 23—158 |

FOREIGN PATENTS

| 71,279 | 9/1893 | Germany. |

OTHER REFERENCES

Handbook of Chemistry, Lange, 10th ed., 1961, pp. 234–235.

OSCAR R. VERTIZ, *Primary Examiner.*

B. H. LEVENSON, *Assistant Examiner.*